US009600612B2

(12) United States Patent
Hajiaghajani et al.

(10) Patent No.: US 9,600,612 B2
(45) Date of Patent: Mar. 21, 2017

(54) SYSTEM AND METHOD FOR FACILITATING DESIGN OF A DIRECT ELECTRICAL HEATING SYSTEM

(71) Applicant: Chevron U.S.A. Inc., San Ramon, CA (US)

(72) Inventors: Masoud Hajiaghajani, Houston, TX (US); Steven Andre, Houston, TX (US); Nwamaka Nzeocha, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 848 days.

(21) Appl. No.: 13/688,843

(22) Filed: Nov. 29, 2012

(65) Prior Publication Data

US 2014/0149086 A1 May 29, 2014

(51) Int. Cl.
*G06F 17/50* (2006.01)

(52) U.S. Cl.
CPC ...... *G06F 17/5018* (2013.01); *G06F 2217/16* (2013.01); *G06F 2217/34* (2013.01); *G06F 2217/80* (2013.01)

(58) Field of Classification Search
None
See application file for complete search history.

(56) References Cited

U.S. PATENT DOCUMENTS 6,264,401 B1 * 7/2001 Langner et al. ............ 405/169
8,386,221 B2 * 2/2013 Tognarelli et al. ............ 703/6

2003/0015436 A1 * 1/2003 Bass et al. ............ 205/740
2013/0246032 A1 * 9/2013 El-Bakry et al. ............ 703/10
2013/0317791 A1 * 11/2013 Danielson ............ 703/2

OTHER PUBLICATIONS

"High Efficiency Heating Method for Subsea Pipelines Heating", Angays, Philippe. © 2011 IEEE.*
"Direct Electrical Heating of Pipelines as a Method of Preventing Hydrate and Wax Plugs", Lervik et al. Copyright © 1998 by The International Society of Offshore and Polllr Engineers.*
"Mineral Insulated Heating Cable Sheath Temperature Test Methods and Design Optimization Techniques", McGrath, et al. © 2011 IEEE.*
"Direct Electrical Heating of Subsea Pipelines—Technology Development and Operating Experience", Nysveen et al. © 2005 IEEE.*
"Operational Experience by Applying Direct Electrical Heating for Hydrate Prevention", Urdahl et al. Copyright 2003, Offshore Technology Conference.*

* cited by examiner

*Primary Examiner* — Omar Fernandez Rivas
*Assistant Examiner* — Nithya J Moll
(74) *Attorney, Agent, or Firm* — Pillsbury Winthrop Shaw Pittman LLP; Karen R. DiDomenicis

(57) ABSTRACT

An interface is provided for a modeling application that determines required current required to deliver a target heat in a direct electrical heating system. The interface facilitates the input of input values implemented by the modeling application without requiring the configuration of an entire model. A technique for determining adjustments to required current between computational iterations reduces the number of iterations needed to converge on a solution.

8 Claims, 7 Drawing Sheets

SYSTEM AND METHOD FOR FACILITATING DESIGN OF A DIRECT ELECTRICAL HEATING SYSTEM

FIELD

The disclosure relates to enhancing an interface to a modeling application that determines required current required to deliver a target heat in a direct electrical heating system, and/or relates to determining adjustments to required current between computational iterations in order to reduce the number of iterations needed to converge on a solution.

BACKGROUND

Direct electrical heating systems are used in pipelines carrying petrochemicals to inhibit the formation of hydrates in the pipeline that could clog a pipeline, leading to various complications. Direct electrical heating systems are complex electrical systems that require costly computation in order to determine parameters that will enable a sufficient heat to be delivered to a given pipeline. Such parameters include an ac current to be generated through the direct electrical heating system to provide sufficient heat. Conventional design approaches leverage known computational and/or modeling applications, but are also costly in terms of man hours in setting up the requisite calculations. Further, conventional approaches tend to not search for enhanced adjustments to inputs to the calculation (like a proposed ac current) to reduce the number of calculations required to converge on a solution.

SUMMARY

One aspect of the disclosure relates to a system configured to facilitate design of a direct electric heating system for a subsea pipeline carrying petrochemicals. The system comprises one or more processors configured to execute computer program modules. The computer program modules may include one or more of an input reception module, an input communication module, an output presentation module, and/or other modules. The input reception module is configured to define an input graphical user interface configured to receive entry and/or selection of input values for a target heat to be generated by the direct electric heating system and for a set of heating system parameters that define various aspects of the direct electric heating system including a pipeline through which petrochemicals are flown and cables used for direct electric heating within the pipeline. The input communication module is configured to pass input values received through the input graphical user interface to a modeling application that implements the input values in a finite element analysis to determine an output value for required current through the direct electric system required to attain the target heat. The output communication module is configured to receive output values from the modeling application for required current through the direct electric system required to attain the target heat and for electrical parameters of the direct electric heating system operating at the target heat. The output presentation module is configured to define an output graphical user interface configured to present one or more of the output values received from the modeling application to the user.

Another aspect of the disclosure relates to a computer-implemented method of facilitating design of a direct electric heating system for a pipeline carrying petrochemicals. The method comprises defining an input graphical user interface configured to receive entry and/or selection of input values for a target heat to be generated by the direct electric heating system and for a set of heating system parameters that define various aspects of the direct electric heating system including a pipeline through which petrochemicals are flown and cables used for direct electric heating within the pipeline; passing input values received through the input graphical user interface to a modeling application that implements the input values in a finite element analysis to determine an output value for required current through the direct electric system required to attain the target heat; receiving output values from the modeling application for required current through the direct electric system required to attain the target heat and for electrical parameters of the direct electric heating system operating at the target heat; and defining an output graphical user interface configured to present one or more of the output values received from the modeling application to the user.

Yet another aspect of the disclosure relates to a system configured to facilitate design of a direct electric heating system for a pipeline carrying petrochemicals. The system comprises one or more processors configured to execute computer program modules. The computer program modules comprise an input data module, a required current setting module, a heat determination module, a heat calculation assessment module, a required current adjustment module, and/or other modules. The input data module is configured to obtain a target heat to be generated by the direct electric heating system and values for a set of heating system parameters that define various aspects of the direct electric heating system including a pipeline through which petrochemicals are flown and cables used for direct electric heating within the pipeline. The required current setting module is configured to specify a proposed required current through the direct electric heating system. The heat determination module is configured to implement finite element analysis to determine actual heat provided by the direct electric heating system at the proposed required current based on the obtained values for the set of heating system parameters. The heat calculation assessment module is configured to assess the determination of the actual heat at the proposed required current by determining whether a difference between the actual heat and the target heat is less than a threshold difference. The required current adjustment module is configured such that responsive to the heat calculation assessment module determining that the difference between the actual heat and the target heat is not less than the threshold difference, the required current adjustment module is configured to determine a required current adjustment to the proposed required current as a function of a ratio of the target heat and the actual heat at the proposed required current. The required current setting module is further configured such that responsive to the required current adjustment module determining a required current adjustment, the required current setting module offsets the proposed required current by the required current adjustment for another iteration of the determination and assessment of actual heat by the heat determination module and the heat calculation adjustment module.

Yet another aspect of the disclosure relates to a method of facilitating design of a direct electric heating system for a pipeline carrying petrochemicals. The method comprises obtaining a target heat to be generated by the direct electric heating system and values for a set of heating system parameters that define various aspects of the direct electric heating system including a pipeline through which petrochemicals are flown and cables used for direct electric heating within the pipeline; specifying a proposed required current through the direct electric heating system; implementing finite element analysis to determine actual heat provided by the direct electric heating system at the proposed required current based on the obtained values for the set of heating system parameters; and assessing the determination of the actual heat at the proposed required current by determining whether a difference between the actual heat and the target heat is less than a threshold difference; responsive to determining that the difference between the actual heat and the target heat is not less than the threshold difference, determining a required current adjustment to the proposed required current as a function of a ratio of the target heat and the actual heat at the proposed required current; and responsive to determining a required current adjustment, offsetting the proposed required current by the required current adjustment for another iteration of the determination and assessment of actual heat.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
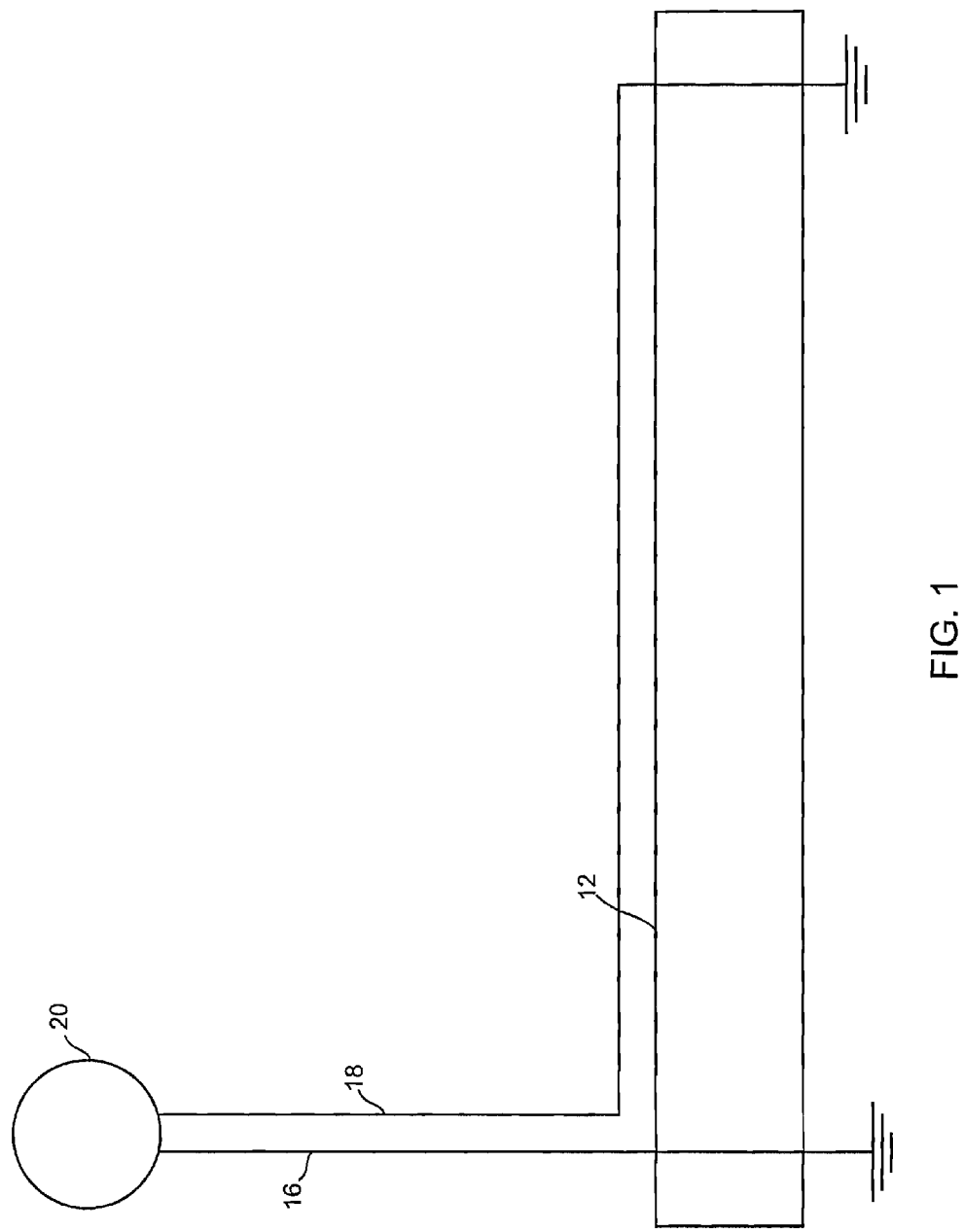
FIG. 1 illustrates a pipeline carrying petrochemicals and a system for providing direct electrical heating.

FIG. 1 illustrates a pipeline 10 to be used to carry petrochemicals that have been from the Earth. For example, pipeline 10 may form, in whole or in part, a tie back from a subea well to another facility at which the petrochemicals will be stored and/or processed. Pipeline 10 is submerged in water.

In the reservoir prior to extraction, petrochemicals are referred to herein as "crude," which is typically under pressure and at relatively high temperatures. As the crude flows from the well it was extracted from through pipeline 10, the seawater in which pipeline 10 is submerged tends to cool the crude. At times, the flow of the crude may be slowed or even temporarily halted, which may further reduce the temperature of the crude in pipeline 10. The cooling crude in pipeline 10 may cause the formation of hydrates or wax in pipeline 10 that can plug pipeline 10 and/or cause other issues.

One way to prevent or mitigate the potential for hydrate formation is to apply heat to the crude in pipeline 10. One technique for applying heat is called direct electrical heating. In this technique, an ac current is forced to run through pipeline 10, and pipeline 10 itself acts as the heating element. The potential is applied through a first cable 16 and a second cable 18 that are terminated to pipeline 10 at opposite ends. As is shown in FIG. 1, second cable 18 may be piggybacked to pipeline 10. A potential source 20 coupled to first cable 16 and second cable 18, and applies a potential that induces an AC current in pipeline 10. For corrosion resistance purposes pipeline 10 is grounded to the water. Although this system seems simple at first blush, it is actually a complex electrical system that is impacted by the impedance of pipeline 10, the water, and the cable. In the end, pipeline 10 conducts much of the current induced by the potential applied to first cable 16 and second cable 18, which generates heat that inhibits or mitigates the formation of hydrates and wax in the crude contained therein. Because of the complex nature of this electrical system, a powerful modeling application is typically required to determine a required current to be delivered through first cable 16 and second cable 18 in order to provide a specified target heat per unit length.

Figure 2:
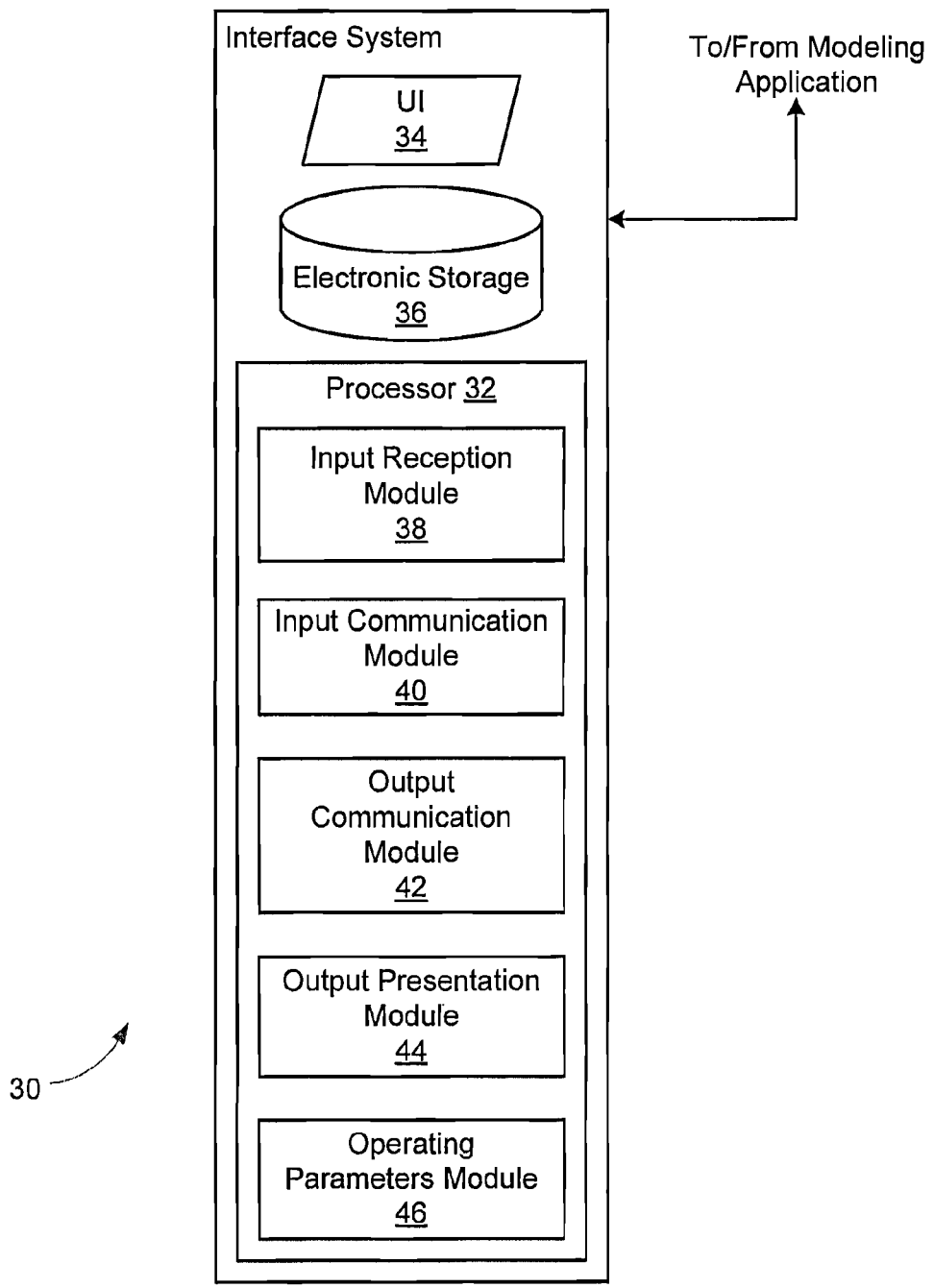
FIG. 2 illustrates a system configured to facilitate the design of a direct electrical heating system.

FIG. 2 illustrates a system 30 configured to facilitate design of a direct electrical heating system (e.g., such as the one shown in FIG. 1 and described herein) for a pipeline carrying petrochemicals. System 30 provides an intuitive interface for a user designing a direct electrical heating system. The interface provides the analytical and processing power of a modeling application with an interface that is relatively intuitive to engineers designing the direct electrical heating system. This may enhance the accuracy of the results, may reduce the cost (e.g., in terms of man hours) in generating the design, and/or provide other enhancements. System 30 may include one or more of one or more processors 32, a user interface 34, electronic storage 36, and/or other components.

Processor 32 is configured to provide information processing within system 30. Processor 32 is configured to execute one or more computer modules. The computer modules may include one or more of an input reception module 38, an input communication module 40, an output communication module 42, an output presentation module 44, an operating parameters module 46, and/or other modules.

Input reception module 38 is configured to define an input graphical user interface for presentation to a user (e.g., via user interface 34). The input graphical user interface is configured to receive entry and/or selection of input values for a target heat (e.g., per unit length) to be generated by the direct electrical heating system being designed, for heating system parameters that define various aspects of the direct electrical heating system, and/or other information. The aspects of the direct electrical heating system defined by the heating system parameters may include, for example, one or more aspects of the pipeline through which petrochemicals are guided, one or more cables used to perform direct electrical heating, and/or other aspects of the direct electrical heating system. By way of non-limiting example, the heating system parameters may include one or more of a pipeline inner diameter, a pipeline thickness, a cable thermal insulation thickness, a concrete wall thickness, a cable radius or diameter, a cable steel core size, a cable electrical insulation thickness, a cable jacket thickness, a power system frequency, a sea water depth, a pipeline length, or a cable distance to pipeline, and/or other parameters.

Figure 3:
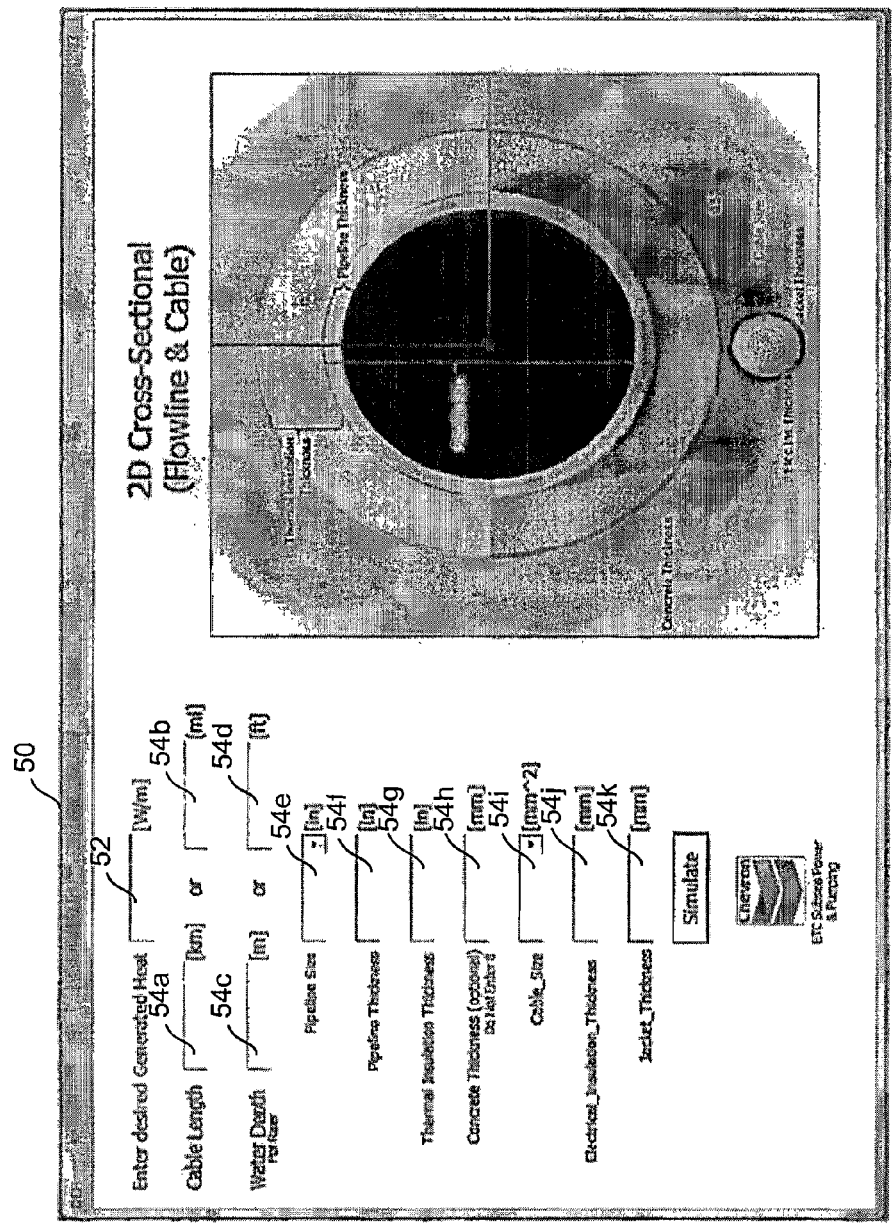
FIG. 3 illustrates a view of an input graphical user interface.

By way of illustration, FIG. 3 depicts a view 50 of the input graphical interface. As can be seen in FIG. 3, view 50 may include a target heat field 52, one or more heating system parameter fields 54 (illustrated as 54a-54k), and/or other fields. Target heat field 52 is configured to receive entry and/or selection of a target heat value for the direct electrical heating system. Heating system parameter fields 54 are configured to receive entry and/or selection of values of heating system parameters for the direct electrical heating system. It will be appreciated that the illustration of the input graphical user interface being implemented in a single view 50 is not intended to be limiting. Various ones of fields 52 and 54, and/or other fields associated with the input graphical user interface, could be provided in separate views.

Returning to FIG. 2, input communication module 40 is configured to pass input values received through the input graphical user interface to a modeling application. The modeling application implements the input values to determine an output value for required current through the direct electrical heating system that will attain the specified target heat. The modeling application may implement, for example, finite element analysis to make this determination. The modeling application may be executed separately from system 30 (e.g., in a modeling system 70 shown in FIG. 5 and described herein). In such implementations, input communication module 40 may facilitate communication over networked and/or direct communication media with the modeling application, and/or via other communication media. The modeling application may be executed on processor 32. However, in such implementations, the modeling application is logically discrete and separate from modules 38, 40, 42, 44, and 46. For example, the modeling application may correspond to one or more pieces of software that are logically and computationally separate from modules 38, 40, 42, 44, and 46. In these implementations, input communication module 40 is configured to effect transfer of the input values to the modeling application through the system architecture implementing system 30.

Output communication module 42 is configured to receive output values from the modeling application. The output values may be for required current through the direct electrical heating system required to attain the target heat, for electrical parameters of the direct electrical heating system operating at the target heat, and/or for parameters or variables. The electrical parameters of the direct electrical heating system may include one or more of resistance per unit length, inductance per unit length, cable impedance, and/or other parameters.

Figure 4:
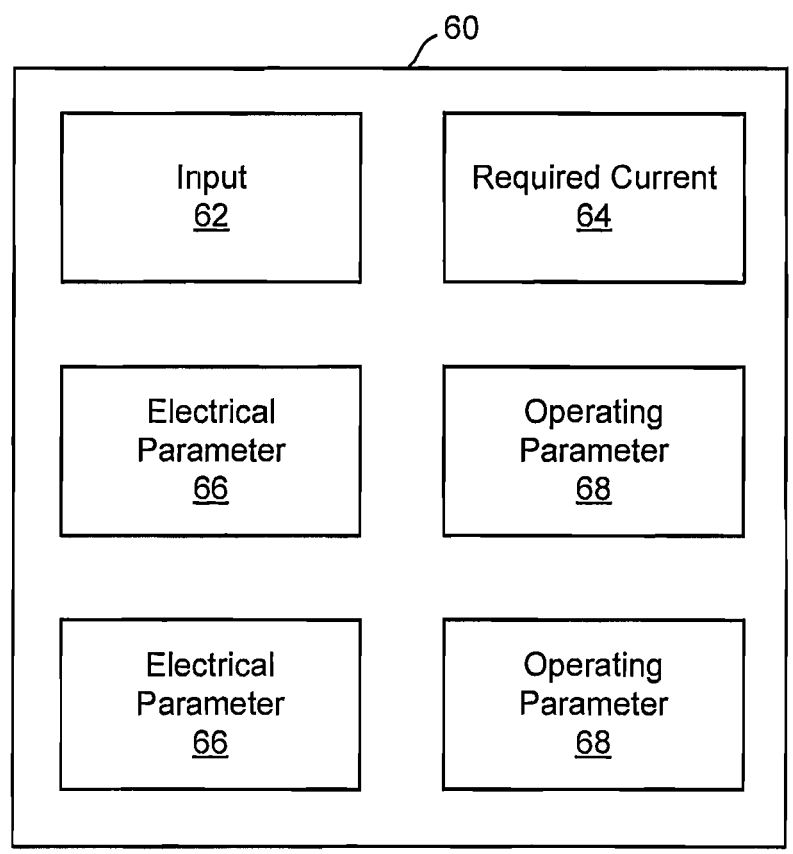
FIG. 4 illustrates a view of an output graphical user interface.

Output presentation module 44 is configured to define an output graphical user interface for presentation to the user (e.g., via user interface 34). The output graphical user interface is configured to present output values received from the modeling application, and/or other information. By way of illustration, FIG. 4 depicts a view 60 of the output graphical user interface. As can be seen in FIG. 4, view 60 may include one or more of one or more input fields 62, a required current field 64, one or more electrical parameter fields 66 (illustrated as 66a and 66b), one or more operating parameter fields 68 (illustrated as 68a and 68b), and/or other fields. Input field 62 is configured to present one or more of the input values entered and/or selected through the input graphical user interface. Required current field 64 is configured to present a required current of the direct electrical heating system operating to produce the target heat. Electrical parameter fields 66 are configured to present electrical parameters of the direct electrical heating system. Operating parameter fields 68 are configured to present operating parameters of the direct electrical heating system while the direct electrical heating system is producing the target heat.

Returning to FIG. 2, operating parameters module 46 is configured to determine one or more operating parameters of the direct electrical heating system while the direct electrical heating system is producing the target heat. Operating parameters module 46 determines the operating parameters of the direct electrical heating system producing the target heat based on the output values received from the modeling application (e.g., the target heat and one or more electrical parameters), the input values submitted to the modeling application, and/or based on other information. The operating parameters may include one or more of system resistance, system inductance, root mean square current, active power, power factor, supply voltage, apparent power, reactive power, required topside voltage (kV), topside power (active, apparent and/or reactive), return current in the pipeline, sea water ac current, system efficiency, and/or other operating parameters.

The operating parameters determined by operating parameters module 46 can be presented to the user, for example, through the output graphical user interface.

Processor 32 may include one or more of a digital processor, an analog processor, a digital circuit designed to process information, an analog circuit designed to process information, a state machine, and/or other mechanisms for electronically processing information. Although processor 32 is shown in FIG. 2 as a single entity, this is for illustrative purposes only. In some implementations, processor 32 may include a plurality of processing units. These processing units may be physically located within the same device, or processor 32 may represent processing functionality of a plurality of devices operating in coordination.

Processor 32 may be configured to execute modules 38, 40, 42, 44, and/or 46 by software; hardware; firmware; some combination of software, hardware, and/or firmware; and/or other mechanisms for configuring processing capabilities on processor 32. It should be appreciated that although modules 38, 40, 42, 44, and 46 are illustrated in FIG. 2 as being co-located within a single processing unit, in implementations in which processor 32 includes multiple processing units, one or more of modules 38, 40, 42, 44, and/or 46 may be located remotely from the other modules. The description of the functionality provided by the different modules 38, 40, 42, 44, and/or 46 described below is for illustrative purposes, and is not intended to be limiting, as any of modules 38, 40, 42, 44, and/or 46 may provide more or less functionality than is described. For example, one or more of modules 38, 40, 42, 44, and/or 46 may be eliminated, and some or all of its functionality may be provided by other ones of modules 38, 40, 42, 44, and/or 46. As another example, processor 32 may be configured to execute one or more additional modules that may perform some or all of the functionality attributed below to one of modules 38, 40, 42, 44, and/or 46.

Electronic storage 36 comprises non-transient electronic storage media that electronically stores information. The electronic storage media of electronic storage 36 may include one or both of system storage that is provided integrally (i.e., substantially non-removable) with system 30 and/or removable storage that is removably connectable to system 30 via, for example, a port (e.g., a USB port, a firewire port, etc.) or a drive (e.g., a disk drive, etc.).

Electronic storage 36 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 36 may include virtual storage resources, such as storage resources provided via a cloud and/or a virtual private network. Electronic storage 36 may store software algorithms, information determined by processor 32, information received via user interface 34, and/or other information that enables system 30 to function properly. Electronic storage 36 may be a separate component within system 30, or electronic storage 36 may be provided integrally with one or more other components of system 30 (e.g., processor 32).

User interface 34 is configured to provide an interface between system 30 and the user through which the user may provide information to and receive information from system 30. This enables data, results, and/or instructions and any other communicable items, collectively referred to as "information," to be communicated between the user and one or more of processor 32, electronic storage 36, and/or other components. Examples of interface devices suitable for inclusion in user interface 34 include a keypad, buttons, switches, a keyboard, knobs, levers, a display screen, a touch screen, speakers, a microphone, an indicator light, an audible alarm, and a printer. In some implementations, user interface 34 actually includes a plurality of separate interfaces. It is to be understood that other communication techniques, either hard-wired or wireless, are also contemplated by the present invention as user interface 32. For example, the present invention contemplates that user interface 32 may be integrated with a removable storage interface provided by electronic storage 36. In this example, information may be loaded into system 30 from removable storage (e.g., a smart card, a flash drive, a removable disk, etc.) that enables the user(s) to customize the implementation of system 30. Other exemplary input devices and techniques adapted for use with system 30 as user interface 34 include, but are not limited to, an RS-232 port, RF link, an IR link, modem (telephone, cable or other). In short, any technique for communicating information with system 30 is contemplated by the present invention as user interface 34.

Figure 5:
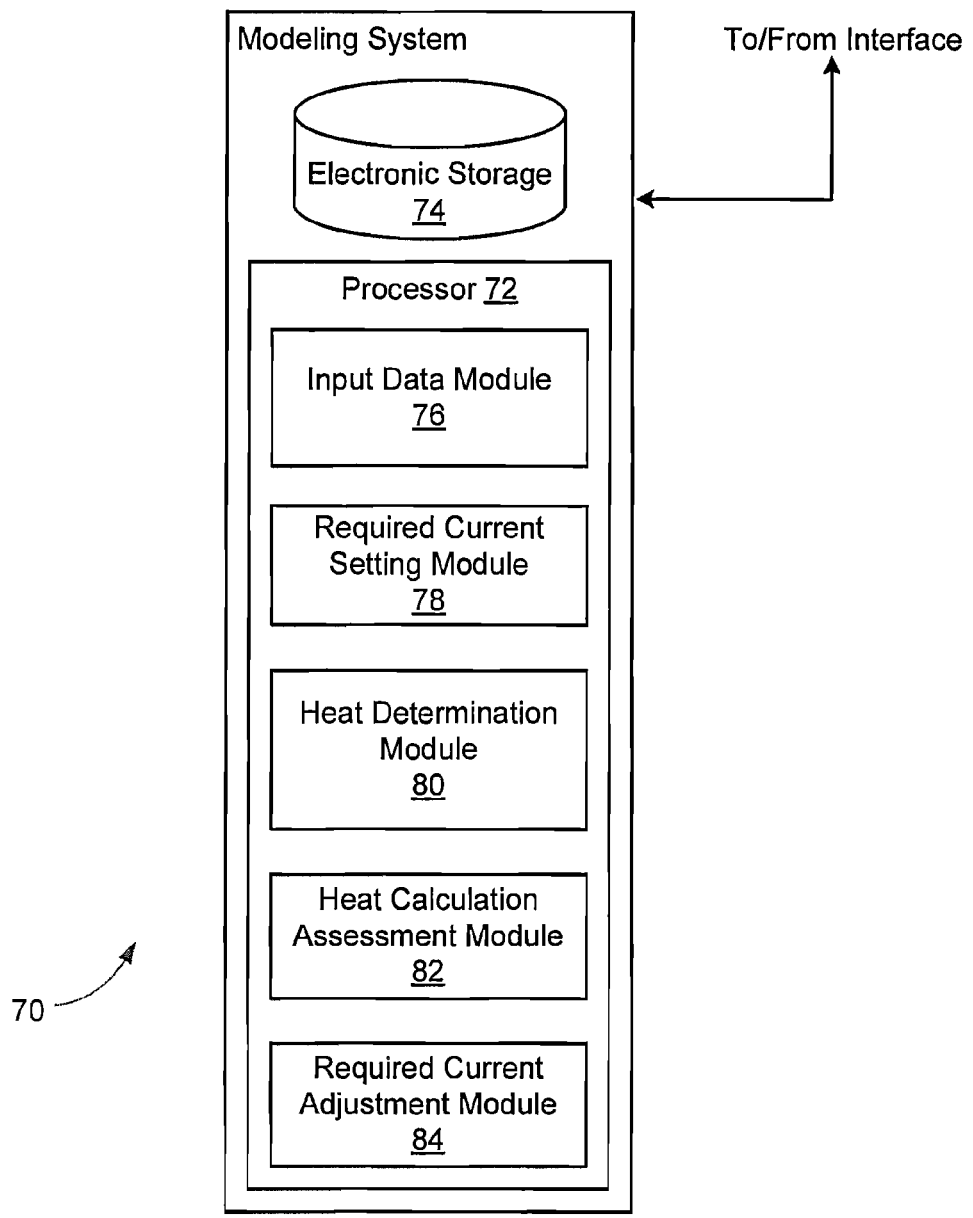
FIG. 5 illustrates a system configured to facilitate the design of a direct electrical heating system.

FIG. 5 illustrates a system 70 configured to facilitate design of a direct electrical heating system for a pipeline carrying petrochemicals. System 70 is configured to perform modeling of the direct electrical heating system that provides a required current required to obtain a specified target heat for the direct electrical heating system. System 70 may implement, for example, finite element analysis and/or other analysis to model the direct electrical heating system. As is shown in FIG. 5, system 70 may include one or more of one or more processors 72, electronic storage 74, and/or other components. It will be appreciated that in some implementations, some or all of the components of system 70 may be common with system 30 (shown in FIG. 2 and described herein). For example, some or all of the functionality attributed herein to processor 72 may be provided by processor 32 shown in FIG. 2 and described herein, or vice versa.

Processor 72 is configured to provide information processing within system 70. Processor 72 is configured to execute one or more computer modules. The computer modules may include one or more of an input data module 76, a required current setting module 78, heat determination module 80, a heat calculation assessment module 82, a required current adjustment module 84, and/or other modules. Modules 76, 78, 80, 82, and/or 84 are configured to model the direct electrical heating system. Modules 76, 78, 80, 82, and/or 84 may be implemented in the modeling application discussed herein, for example with respect to system 30 shown in FIG. 2.

Input data module 76 is configured to obtain input values for to target heat to be generated by the direct electrical heating system. The input values may specify one or more of a target heat, values for a set of heating system parameters, and/or other input values. Obtaining the input values may include receiving the input values from an interface with a user (e.g., through the interface provided by system 30 shown in FIG. 2), accessing stored input values, receiving input values over a network, and/or obtaining the input values in other ways.

Required current setting module 78 is configured to specify a proposed required current through the direct electrical heating system. Required current setting module 78 may be configured such that an initial proposed required current is specified based on a default value, based on one or more of the heating system parameters, based on user input, and/or based on other information.

Heat determination module 80 is configured to determine an actual heat provided by the direct electrical heating system for a present proposed required current. The determination is made based on the obtained input values for the set of heating system parameters. Heat determination module 80 may be configured to implement finite element analysis to determine the actual heat provided for the present proposed required current. Heat determination module 80 may be configured such that the analysis performed provides values for electrical parameters of the direct electrical heating system operating at the present proposed required current.

Heat calculation assessment module 82 is configured to assess the determination of the actual heat at the present proposed required current. This assessment includes evaluating whether the determined actual heat is close enough to the target heat. In some implementations, heat calculation assessment module 82 is configured such that assessing the actual heat includes determining whether a difference between the actual heat and the target heat is less than a threshold difference. The threshold difference may be a set system parameter, received from a user, determined based on heating system parameters and/or pipeline parameters, and/or obtained in other ways.

Required current adjustment module 84 is configured such that, responsive to heat calculation assessment module 82 determining that the different between the actual heat is not close enough to the target heat, required current adjustment module 84 determines a required current adjustment to the present proposed required current. The determination of the required current adjustment is made to reduce a number of iterations required to determine a proposed required current that will cause the direct electrical heating system to provide a satisfactory actual heat. This determination of required current adjustment is made as a function of a ratio of the target heat and the actual heat at the present proposed required current. The determination may make use of the relationship between heat and current within the direct electrical heating system. This relationship may be expressed as:

$$\text{Heat} = \frac{1}{2} R_{ac} * I^2 \qquad (1)$$

where Heat represents the heat in the direct electrical heating system, $R_{ac}$ represents the resistance of the direct electrical heating system, and I represents the required current.

For the actual and target heats, equation (1) can be used to derive the relationship:

$$\frac{I_{Target}}{I_{actual}} = \sqrt{\frac{Heat_{Target}}{Heat_{actual}}} \quad (2)$$

wherein $I_{Target}$ represents the required current that may provide the target heat in the direct electrical heating system, $I_{actual}$ represents the present proposed required current, $Heat_{Target}$ represents the target heat, and $Heat_{actual}$ represents the actual heat at the present proposed required current.

From equation (2), an adjusted proposed required current can be obtained as:

$$I_{Target} = I_{actual} \sqrt{\frac{Heat_{Target}}{Heat_{actual}}} \quad (3)$$

It will be appreciated that the relationship expressed in equation (1) and leveraged in equation (3) to determine the required current that may provide the target heat (or the adjusted proposed required current) does not take into account the full complexity of the direct electrical heating system. However, this approximation does provide a far better adjustment to the proposed required current than other conventional methods (e.g., such as a fixed increment and/or other methods). As such, implementing the adjustment to the proposed required current determined by required current adjustment module 84 may facilitate more efficient calculation of the required current that will provide the target heat (e.g., with fewer iterations through the modeling analysis).

Required current setting module 78 is configured, responsive to required current adjustment module 84 determining an adjustment to the present proposed required current, to set the proposed required current at the adjusted proposed required current determined. Modules 80, 82, and/or 84 may then iterate implementing the adjusted proposed required current as the present proposed required current.

Processor 72 may include one or more of a digital processor, an analog processor, a digital circuit designed to process information, an analog circuit designed to process information, a state machine, and/or other mechanisms for electronically processing information. Although processor 72 is shown in FIG. 5 as a single entity, this is for illustrative purposes only. In some implementations, processor 72 may include a plurality of processing units. These processing units may be physically located within the same device, or processor 72 may represent processing functionality of a plurality of devices operating in coordination.

Processor 72 may be configured to execute modules 76, 78, 80, 82, and/or 84 by software; hardware; firmware; some combination of software, hardware, and/or firmware; and/or other mechanisms for configuring processing capabilities on processor 72. It should be appreciated that although modules 76, 78, 80, 82, and 84 are illustrated in FIG. 5 as being co-located within a single processing unit, in implementations in which processor 72 includes multiple processing units, one or more of modules 76, 78, 80, 82, and/or 84 may be located remotely from the other modules. The description of the functionality provided by the different modules 76, 78, 80, 82, and/or 84 described below is for illustrative purposes, and is not intended to be limiting, as any of modules 76, 78, 80, 82, and/or 84 may provide more or less functionality than is described. For example, one or more of modules 76, 78, 80, 82, and/or 84 may be eliminated, and some or all of its functionality may be provided by other ones of modules 76, 78, 80, 82, and/or 84. As another example, processor 72 may be configured to execute one or more additional modules that may perform some or all of the functionality attributed below to one of modules 76, 78, 80, 82, and/or 84.

Electronic storage 74 comprises non-transient electronic storage media that electronically stores information. The electronic storage media of electronic storage 74 may include one or both of system storage that is provided integrally (i.e., substantially non-removable) with system 70 and/or removable storage that is removably connectable to system 70 via, for example, a port (e.g., a USB port, a firewire port, etc.) or a drive (e.g., a disk drive, etc.). Electronic storage 74 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 74 may include virtual storage resources, such as storage resources provided via a cloud and/or a virtual private network. Electronic storage 74 may store software algorithms, information determined by processor 72, information received via user interface 34, and/or other information that enables system 70 to function properly. Electronic storage 74 may be a separate component within system 70, or electronic storage 74 may be provided integrally with one or more other components of system 70 (e.g., processor 72).

Figure 6:
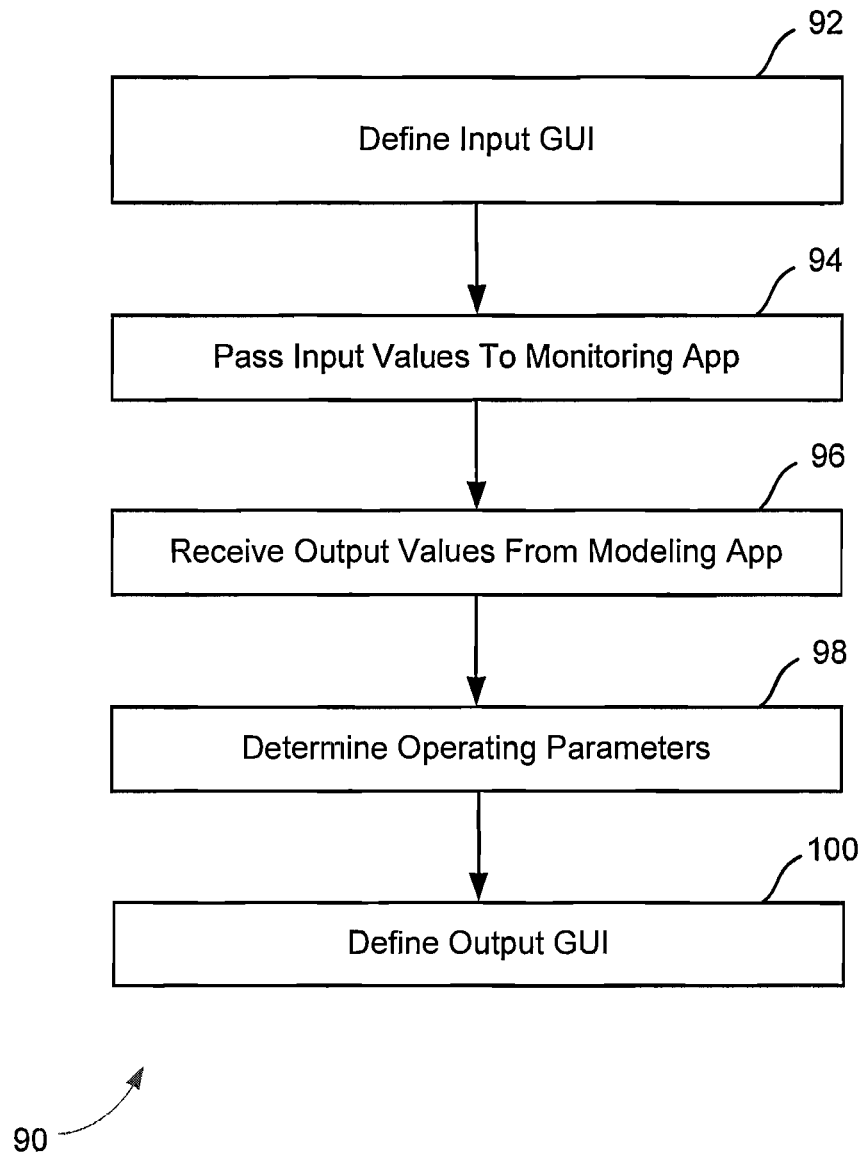
FIG. 6 illustrates a method of facilitating the design of a direct electrical heating system.

FIG. 6 illustrates a method 90 of facilitate desing of a direct electrical heating system for a pipeline carrying petrochemicals. The operations of method 90 presented below are intended to be illustrative. In some embodiments, method 90 may be accomplished with one or more additional operations not described, and/or without one or more of the operations discussed. Additionally, the order in which the operations of method 90 are illustrated in FIG. 6 and described below is not intended to be limiting.

In some embodiments, method 90 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 90 in response to instructions stored electronically on an electronic storage medium. The one or more processing devices may include one or more devices configured through hardware, firmware, and/or software to be specifically designed for execution of one or more of the operations of method 90.

At an operation 92, an input graphical user interface is defined. The input graphical user interface is configured to receive entry and/or selection of input values for a target heat to be generated by the direct electrical heating system, a set of heating system parameters, and/or other input values. In some implementations, operation 92 is performed by an input reception module the same as or similar to input reception module 38 (shown in FIG. 2 and described herein).

At an operation 94, input values received through the input graphical user interface are passed to a modeling application. The modeling application may model the direct electrical heating system using the input values to determine a required current that will produce the target heat in the direct electrical heating system. The modeling application may implement finite element analysis to model the direct electrical heating system. In some implementations, operation 94 is performed by an input communication module the same as or similar to input communication module 40 (shown in FIG. 2 and described herein).

At an operation 96, output values are received from the modeling application. The modeling application may include output values for one or more of a required current, one or more electrical parameters of the direct electrical heating system, and/or other output values. In some implementations, operation 96 is performed by an output communication module the same as or similar to output communication module 42 (shown in FIG. 2 and described herein).

At an operation 98, the output values received at operation 96 are used to determine one or more operating parameters of the direct electrical heating system operating to produce the target heat. In some implementations, operation 98 is performed by an operating parameters module the same as or similar to operating parameters module 46 (shown in FIG. 2 and described herein).

At an operation 100, an output graphical user interface is defined. The output graphical user interface may present one or more of the output values received at operation 96, one or more of the operating parameters determined at operation 98, and/or other information. In some implementations, operation 100 is performed by an output presentation module the same as or similar to output presentation module 44 (shown in FIG. 2 and described herein).

Figure 7:
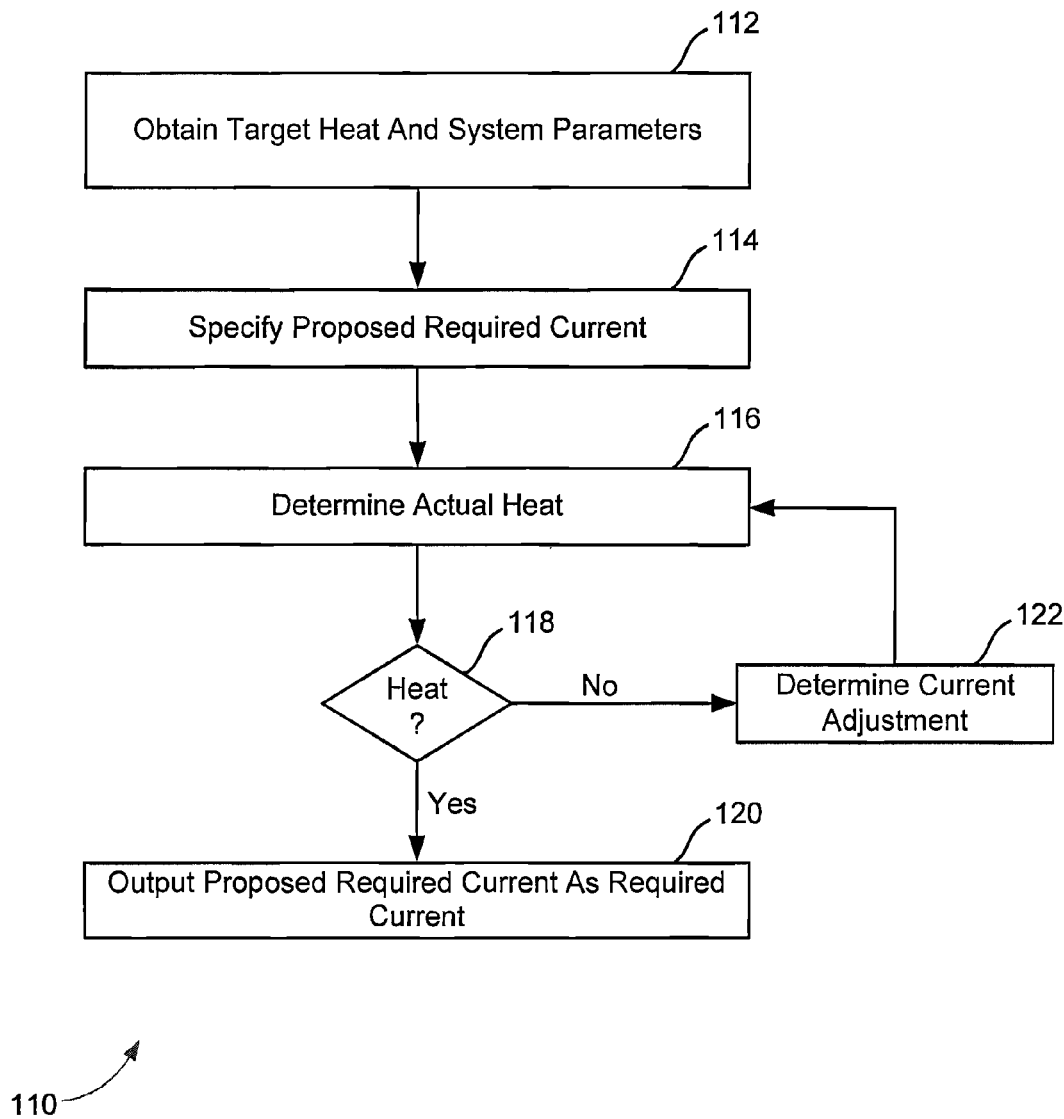
FIG. 7 illustrates a method of facilitating the design of a direct electrical heating system.

FIG. 7 illustrates a method 110 of facilitate desing of a direct electrical heating system for a pipeline carrying petrochemicals. The operations of method 110 presented below are intended to be illustrative. In some embodiments, method 110 may be accomplished with one or more additional operations not described, and/or without one or more of the operations discussed. Additionally, the order in which the operations of method 110 are illustrated in FIG. 7 and described below is not intended to be limiting.

In some embodiments, method 110 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 110 in response to instructions stored electronically on an electronic storage medium. The one or more processing devices may include one or more devices configured through hardware, firmware, and/or software to be specifically designed for execution of one or more of the operations of method 110.

At an operation 112, a target heat to be generated by the direct electrical heating system is obtained along with heating system parameters for the direct electrical heating system and/or other information. In some implementations, operation 112 is performed by an input data module the same as or similar to input data module 76 (shown in FIG. 5 and described herein).

At an operation 114, a proposed required current through the direct electrical heating system is set as the present proposed required current. In some implementations, operation 114 is performed by a required current setting module the same as or similar to required current setting module 78 (shown in FIG. 5 and described herein).

At an operation 116, the actual heat produced by the direct electrical heating system at the present proposed required current is determined. Electrical parameters of the system operating at the present proposed required current may be determined. The determination made at operation 116 may implement finite element analysis. In some implementations, operation 116 is performed by a heat determination module the same as or similar to heat determination module 80 (shown in FIG. 5 and described herein).

At an operation 118, the determination of actual heat produced at the present proposed required current is assessed with respect to the target heat. In some implementations, operation 118 is performed by a heat calculation assessment module the same as or similar to heat calculation assessment module 82 (shown in FIG. 5 and described herein).

Responsive to a determination at operation 118 that the actual heat produced at the present proposed required current is close enough to the target heat, method 110 proceeds to an operation 120. At operation 120, the present proposed required current is returned as the required current for the target heat. The electrical parameters determined at operation 118 may be returned as the electrical parameters of the direct electrical heating system producing the target heat.

Responsive to a determination at operation 118 that the actual heat produced at the present proposed required current is not close enough to the target heat, method 110 proceeds to an operation 122. At operation 122, a required current adjustment is determined. The required current adjustment is determined as a function of a ratio of the target heat and the actual heat at the present proposed required current. In some implementations, operation 122 is performed by a required current adjustment module the same as or similar to required current adjustment module 84 (shown in FIG. 5 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate design of a direct electric heating system for a pipeline carrying petrochemicals, the system comprising:

a) one or more processors configured to execute computer program modules, the computer program modules comprising:

i. an input data module configured to obtain a target heat to be generated by the direct electric heating system and values for a set of heating system parameters that define various aspects of the direct electric heating system including a pipeline through which petrochemicals are flown and cables used for direct electric heating within the pipeline;

ii. a required current setting module configured to specify a proposed required current through the direct electric heating system;

iii. a heat determination module configured to implement finite element analysis to determine actual heat provided by the direct electric heating system at the proposed required current based on the obtained values for the set of heating system parameters;

iv. a heat calculation assessment module configured to assess the determination of the actual heat at the proposed required current by determining whether a difference between the actual heat and the target heat is less than a threshold difference; and v. a required current adjustment module configured such that responsive to the heat calculation assessment module determining that the difference between the actual heat and the target heat is not less than the threshold difference, the required current adjustment module is configured to determine a required current adjustment to the proposed required current as a function of a square root of the ratio of the target heat and the actual heat at the proposed required current;

wherein the required current setting module is further configured such that responsive to the required current adjustment module determining a required current adjustment, the required current setting module offsets the proposed required current by the required current adjustment for another iteration of the determination and assessment of actual heat by the heat determination module and the heat calculation adjustment module; and b) a first and second cable wherein the first and second cable terminate at opposite ends of the pipeline for delivering the proposed required current as offset by the required current adjustment.

2. The system of claim 1, wherein the heat determination module is further configured such that the finite element analysis further provides values for electrical parameters of the direct electric heating system operating at the proposed required current.

3. The system of claim 1, wherein the required current setting module is configured such that an initial proposed required current is a predetermined value.

4. The system of claim 1, wherein the input data module is configured such that the set of heating system parameters comprise one or more of a pipeline inner diameter, a pipeline thickness, a cable thermal insulation thickness, a concrete wall thickness, a cable radius, a cable steel core size, a cable electrical insulation thickness, a cable jacket thickness, a power system frequency, a sea water depth, a pipeline length, or a cable distance to pipeline.

5. A method of facilitating design of a direct electric heating system for a pipeline carrying petrochemicals, the method being implemented in a computer system that includes one or more physical processors, the method comprising:

obtaining a target heat to be generated by the direct electric heating system and values for a set of heating system parameters that define various aspects of the direct electric heating system including a pipeline through which petrochemicals are flown and cables used for direct electric heating within the pipeline;

specifying a proposed required current through the direct electric heating system;

implementing finite element analysis to determine actual heat provided by the direct electric heating system at the proposed required current based on the obtained values for the set of heating system parameters;

assessing the determination of the actual heat at the proposed required current by determining whether a difference between the actual heat and the target heat is less than a threshold difference;

responsive to determining that the difference between the actual heat and the target heat is not less than the threshold difference, determining a required current adjustment to the proposed required current as a function of a square root of the ratio of the target heat and the actual heat at the proposed required current;

responsive to determining a required current adjustment, offsetting the proposed required current by the required current adjustment for another iteration of the determination and assessment of actual heat; and delivering the proposed required current as offset by the required current adjustment through a first and second cable wherein the first and second cable terminate at opposite ends of the pipeline.

6. The method of claim 5, wherein the finite element analysis further provides values for electrical parameters of the direct electric heating system operating at the proposed required current.

7. The method of claim 5, wherein an initial proposed required current is a predetermined value.

8. The method of claim 5, wherein the set of heating system parameters comprise one or more of a pipeline inner diameter, a pipeline thickness, a cable thermal insulation thickness, a concrete wall thickness, a cable radius, a cable steel core size, a cable electrical insulation thickness, a cable jacket thickness, a power system frequency, a sea water depth, a pipeline length, or a cable distance to pipeline.

* * * * *